Sept. 24, 1929. C. W. SCHWENZFEIER 1,729,363
MOLD FOR FORMING GLASSWARE
Filed Oct. 29, 1927 2 Sheets-Sheet 1
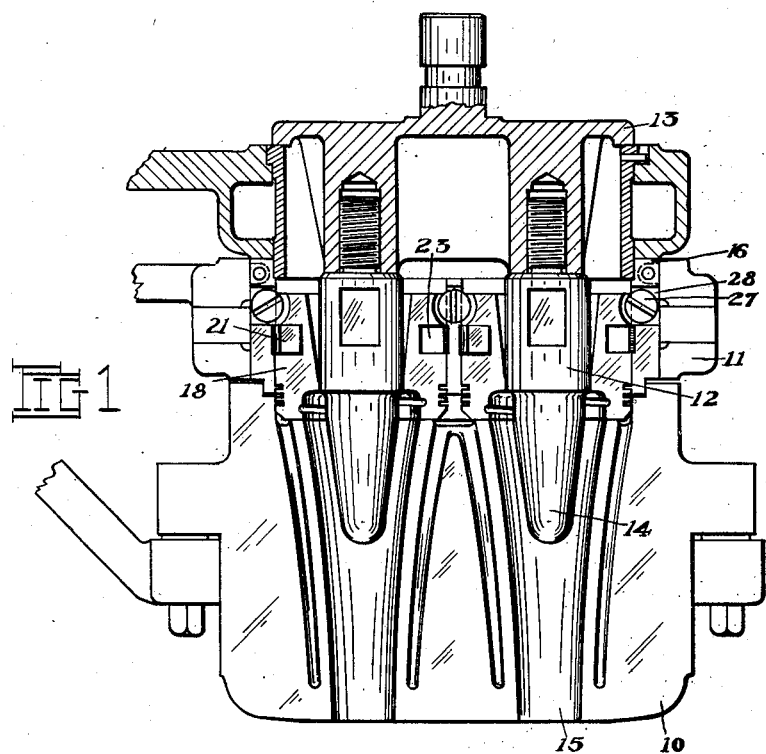
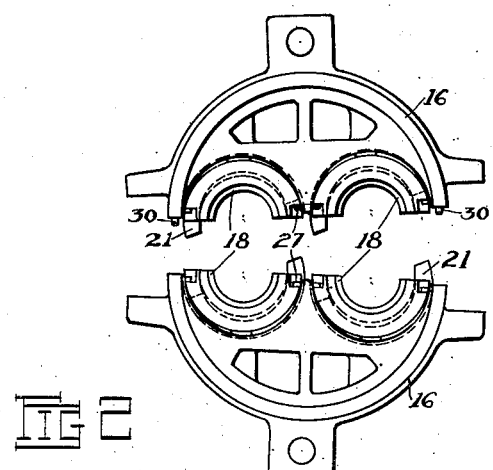

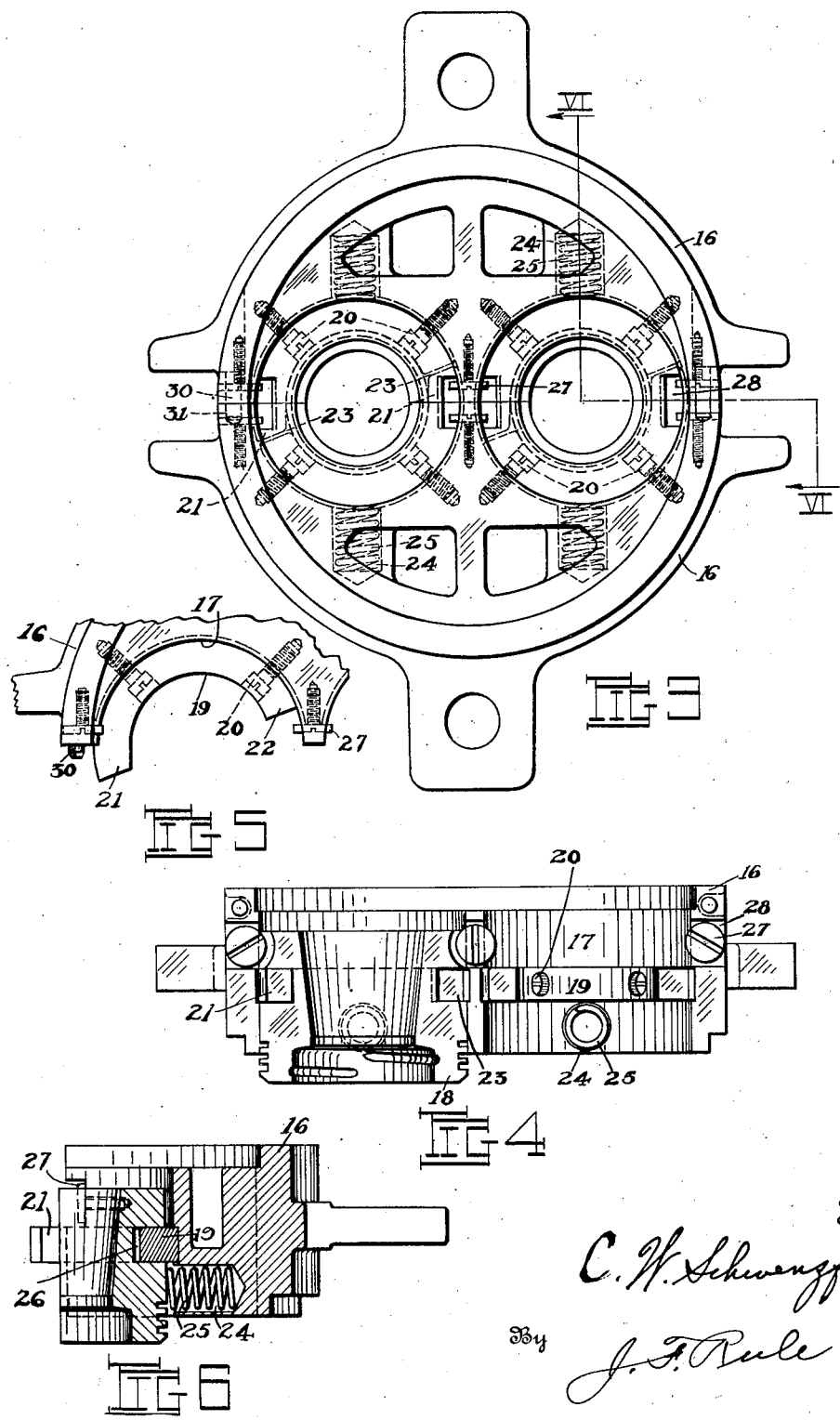

Patented Sept. 24, 1929

1,729,363

UNITED STATES PATENT OFFICE

CARL W. SCHWENZFEIER, OF TOLEDO, OHIO, ASSIGNOR TO OWENS-ILLINOIS GLASS COMPANY, OF TOLEDO, OHIO, A CORPORATION OF OHIO

MOLD FOR FORMING GLASSWARE

Application filed October 29, 1927. Serial No. 229,582.

The present invention relates to the improvements in molds for forming glassware and more particularly to neck molds.

Glassware formed in plural or single cavity molds of ordinary construction is quite frequently imperfect due to offset necks and other objectionable formations in proximity to the neck or mouth of the article. This condition is due in part to disalignment of corresponding body and neck mold cavities. Ordinarily, the neck mold thimble is rigidly connected to the neck mold body and except where unusual care has been exercised in the machining and fitting the several elements, the neck mold thimble sections do not properly align with the body mold, and in many instances the thimble sections themselves are spaced apart slightly even after the neck mold sections have been closed.

It is the purpose of the present invention to eliminate the necessity for extremely accurate fitting of thimbles into the neck mold sections, and provide such connection between the thimble sections and neck mold that these thimble sections may shift their positions and automatically effect accurate alignment of the cavities in the body molds and neck mold thimbles.

A further object is to provide such neck mold thimble mounting that the thimbles will automatically align themselves with the body molds and at the same time permit complete closing of the neck molds.

Other objects will be apparent hereinafter.

In the accompanying drawings:

Fig. 1 is a part sectional elevation showing the application of the present invention.

Fig. 2 is a plan view showing a neck mold embodying the present invention and approaching a closed position.

Fig. 3 is a view similar to Fig. 2 on an enlarged scale showing the neck mold closed.

Fig. 4 is a detail elevation of the inner face of a neck mold section, showing one of the thimbles in position, the other thimble being removed to disclose the supporting shoulder or rib.

Fig. 5 is a fragmentary detail showing the relation and connection between one of the semi-circular thimble supporting ribs and the corresponding neck mold section.

Fig. 6 is a detail sectional view taken along the line VI—VI of Fig. 3, showing one section of the neck mold thimble in its projected or outermost position.

In the drawings, a partible body blank mold 10 is shown in cooperative relation to a partible neck mold 11 into which plungers 12 depending from a gathering head 13 project. The tips 14 of the plungers 12 project into the mold cavities 15 to form initial blow openings in the blanks as is customary.

Each neck mold section 16 is formed according to the present disclosure, with a pair of semi-circular recesses 17 spaced longitudinally of its inner face and adapted to receive and support therein a pair of neck mold thimble sections 18. Substantially centrally of each recess 17, there is arranged a thimble section supporting shoulder or rib 19 which is of substantially semi-circular formation and is attached to the neck mold section by screws 20 or similar fastening elements. In mounting each semi-circular rib 19 in the corresponding recess 17, the rib is so positioned that one end 21 (Figs. 2 and 5) projects beyond the inner flat face of the corresponding mold section, while its other end 22 is set inwardly from said face for a purpose presently apparent. The semi-circular ring or shoulder 19 in the corresponding recess in the other neck mold section 16 is arranged just the reverse of the first named shoulder so that when the neck mold sections are closed together, the extended ends or tongues 21 project into sockets 23 (Figs. 3 and 4) in the opposed mold sections and thereby effectively hold the two sections against relative vertical movement.

The wall of each recess 17 is formed with a socket 24 at the inner side and preferably at right angles to the mold center line. Coil springs 25 are arranged in these sockets 24 and exert outward yielding pressure against the neck mold thimble sectons 18. Thus, when the neck mold sections 16 are separated, these springs cause portions of the neck mold thimble sections 18 to project beyond the meeting surfaces of said mold sections.

Each section 18 of the neck mold thimbles is formed with an external channel 26 into which the supporting shoulder 19 projects. It will be noted that a portion of the wall of this channel, together with the spacing of one end of each shoulder section 19 inwardly from the meeting face of the corresponding neck mold section, provides the recesses 23 heretofore referred to and into which the tongue 21 of the opposite part of the shoulder extends. The lower ends of the neck mold thimbles project below the neck mold and are engaged by the body mold sections during closing of the body mold. Thus, the thimble sections are drawn inwardly into contact with each other and into alignment with the body mold when the latter closes.

Outward movement of the neck mold thimble sections 19 is limited by stops, which according to the present embodiment, comprise flat headed screws (Fig. 3) mounted in recesses 28 formed in the meeting faces of the neck mold sections 16. These screws 27 (Fig. 4) are so positioned that with a predetermined degree of outward movement on the part of a section 18 of the neck mold thimble, such section will engage the stops and be held against further outward movement. The spacing of stops outwardly from the extreme innermost position of the ends of each section of the neck mold thimble obviously permits a certain degree of free circular movement on the part of each section and thereby further facilitates automatic alignment of the neck and body mold cavities. This invention, which may be termed "a floating neck mold thimble", in addition to providing for accurate alignment of the cavities in the body mold and neck mold, allows complete closing of the neck mold in that the thimbles may readily yield and accurately align their outer flat faces with the meeting faces of the neck mold sections 16 and therefore will not obstruct movement of the neck mold sections into engagement with each other. Thus, objectionable formations in the glassware, often resulting from partial closing of the neck mold, are entirely avoided. As a further means to insure alignment of the neck mold sections 16, one section is provided with a pair of dowel pins 30 which, when the mold sections are closed, project into sockets 31 in the other section and assist the tongues 21 on the ribs 19 in preventing relative vertical movement between the two neck mold sections 16.

From the foregoing, it is apparent that molds constructed along the lines set forth, will produce glassware more nearly approaching perfection than molds in which the neck mold thimbles are rigidly connected to the neck mold sections. As is evident, the ribs or semi-circular rings 19 which support the sections 18 of the neck mold thimbles against vertical movement, also provide means for aligning the two neck mold sections 16 and, as stated, prevent objectionable vertical movement of the sections relative to each other.

While the accompanying drawings and foregoing description set forth the invention more or less in detail, it is understood that modifications thereof may be resorted to within the spirit and scope of the appended claims.

What I claim is:

1. In combination, a neck mold having a vertical opening therein, a neck mold thimble, and means mounting the thimble in said opening for radial movement therein.

2. In combination, a neck mold having a vertical opening therein, a neck mold thimble, and means mounting the neck mold thimble in said opening for radial and rotary movement therein.

3. In combination, a neck mold having a vertical opening therein, a neck mold thimble, means mounting the neck mold thimble in said opening for radial and rotary movement therein, and means to limit the degree of radial movement.

4. In combination, a neck mold having a vertical opening therein, a neck mold thimble, means mounting the neck mold thimble in said opening for radial and rotary movement therein, and stops extending radially inward from the walls of the opening to limit the degree of rotary movement of said thimble.

5. In combination, a partible neck mold having a vertical opening therein, a two-section neck mold thimble in said opening, yielding means normally tending to move the neck mold thimble laterally away from the neck mold, and means to limit the degree of such movement.

6. In combination, a neck mold comprising a pair of sections movable into and out of cooperative relation to each other and having semi-circular ways in their meeting faces cooperating with each other to form a vertical opening through the neck mold, a semi-circular thimble supporting rib rigidly mounted in each way, each rib having a finger extending beyond the inner face of the corresponding neck mold section, a two-section neck mold thimble, one section arranged in each way on the rib therein, each section of the neck mold thimble having a pocket at one end to receive the finger on the ring carrying the other thimble section when the two neck mold sections are brought into cooperative relation with each other.

7. In combination, a partible body mold, a partible neck mold, a sectional neck mold thimble carried by the neck mold and mounted for radial movement thereon, and portions carried by the neck mold thimble sections and adapted to be engaged by the body mold during closing of the latter to shift the neck mold thimble sections relative to the neck mold and thereby align the cavities of the neck and body molds.

8. In combination, a body mold, a neck mold having a vertical opening therethrough, and a neck mold thimble loosely mounted in said opening and movable radially at times relative to the neck mold by contact with the body mold.

9. In combination, a body mold, a partible neck mold having a vertical opening at the parting line, a two-part neck mold thimble mounted in said opening, means to alternately open and close the neck mold and thereby correspondingly move the two parts of the neck mold thimble, and means whereby closing of the body mold will at times cause radial movement of the neck mold thimbles relative to the neck mold.

10. In combination, a two-section neck mold, said sections formed with semi-circular vertical ways in their meeting faces cooperating with each other to form a plunger opening, a two-section neck mold thimble, and means yieldingly mounting one section in each of said ways for radial movement therein.

11. In combination, a two-section neck mold, said sections formed with semi-circular vertical ways in their meeting faces cooperating with each other to form a plunger opening, a semi-circular shoulder in each way, a two-section neck mold thimble, one section mounted on each semi-circular shoulder, spring means exerting outward pressure on the thimble sections, and stops carried by each neck mold section to limit the degree of outward movement of the thimble sections.

12. In combination, a two-section neck mold, said sections formed with semi-circular vertical ways in their meeting faces cooperating with each other to form a plunger opening, a semi-circular shoulder in each way, a two-section neck mold thimble, one section mounted on each semi-circular shoulder, spring means exerting outward pressure on the thimble sections, and stops carried by each neck mold section to limit the degree of outward movement of the thimble sections, said stops arranged relative to the neck mold thimble sections to permit limited rotary movement of the latter.

Signed at Toledo, in the county of Lucas and State of Ohio, this 27th day of October, 1927.

CARL W. SCHWENZFEIER.